US011288230B2

(12) United States Patent
Jiang et al.

(10) Patent No.: US 11,288,230 B2
(45) Date of Patent: Mar. 29, 2022

(54) METHOD, DEVICE AND COMPUTER PROGRAM PRODUCT FOR MANAGING DATA REPLICATION

(71) Applicant: EMC IP Holding Company LLC, Hopkinton, MA (US)

(72) Inventors: Eason Jiang, Chengdu (CN); Felix Peng, Chengdu (CN); Eddie Dai, Chengdu (CN); Fubin Zhang, Chengdu (CN); Beryl Wang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 105 days.

(21) Appl. No.: 16/286,592

(22) Filed: Feb. 27, 2019

(65) Prior Publication Data

US 2020/0133917 A1 Apr. 30, 2020

(30) Foreign Application Priority Data

Oct. 25, 2018 (CN) .......................... 201811251871.5

(51) Int. Cl.
*G06F 16/215* (2019.01)
*G06F 16/11* (2019.01)
*G06F 3/06* (2006.01)

(52) U.S. Cl.
CPC ............ *G06F 16/125* (2019.01); *G06F 3/065* (2013.01); *G06F 3/0605* (2013.01); *G06F 3/067* (2013.01)

(58) Field of Classification Search
None
See application file for complete search history.

(56) References Cited

U.S. PATENT DOCUMENTS

| 2003/0135382 A1* | 7/2003 | Marejka | G06F 11/3495 |
| | | | 709/232 |
| 2005/0120025 A1* | 6/2005 | Rodriguez | G06F 16/162 |
| 2008/0229037 A1* | 9/2008 | Bunte | G06F 16/113 |
| | | | 711/162 |

OTHER PUBLICATIONS

Kapanowski et al. Resource Storage Management Model for Ensuring Quality of Service in the Cloud Archive Systems. Computer Science 15(1) 2014, pp. 3-18. (Year: 2014).*

* cited by examiner

*Primary Examiner* — Alex Gofman
*Assistant Examiner* — Shelly X Qian
(74) *Attorney, Agent, or Firm* — Womble Bond Dickinson (US) LLP

(57) ABSTRACT

Embodiments of the present disclosure provide a method, a device and a computer program product for managing data replication. According to example implementations of the present disclosure, a replication policy model associated with data replication of a source device can be obtained, which is determined based on historical status information of the source device and a historical replication policy corresponding to the historical status information; current status information of the source device is determined, wherein the current status information indicates status information associated with pending data replication of the source device; and a target replication policy is determined based on the replication policy model and the current status information, which indicates a replication policy to be applied for performing the pending data replication. Therefore, the replication policy can be adjusted automatically based on the status of the source device, enabling a more efficient and intelligent data replication of the source device.

15 Claims, 4 Drawing Sheets

METHOD, DEVICE AND COMPUTER PROGRAM PRODUCT FOR MANAGING DATA REPLICATION

CROSS-REFERENCE TO RELATED APPLICATION

This patent application claims priority, under 35 U.S.C. § 119, of Chinese Patent Application No. 201811251871.5, filed Oct. 25, 2018, entitled "METHOD, DEVICE AND COMPUTER PROGRAM PRODUCT FOR MANAGING DATA REPLICATION."

FIELD

Embodiments of the present disclosure generally relate to the field of data storage, and more specifically, to a method, a device and a computer program product for managing data replication.

BACKGROUND

Data backup refers to a procedure of replicating all or a part of a dataset from a storage system of an application host to other storage media, to prevent data loss resulting from operation errors or system failure. Typically, data protection is provided through data backup. With growing demands on data protection, the size of the dataset to be replicated is increased accordingly.

A current backup/recovery solution manages a replication policy at a user end through the following steps: a user manually sets a schedule for replicating and length of time for retaining replicated data at a server end based on a replication policy formulated according to needs; and the user updates the replication policy manually when necessary. It can be seen that the current solution of managing data replication depends on a manual input and therefore the efficiency thereof is relatively low. In addition, the flexibility and adaptability of the current solution are low. For example, the replication policy cannot be updated automatically when importance of data at the user end is changed, resulting in failing to protect significant data in time.

SUMMARY

Embodiments of the present disclosure provide a method, a device and a computer program product for managing data replication.

In a first aspect of the present disclosure, there is provided a method of managing data replication, comprising: obtaining a replication policy model associated with data replication of a source device, the replication policy model being determined based on historical status information of the source device and a historical replication policy corresponding to the historical status information; determining current status information of the source device, wherein the current status information indicates status information associated with pending data replication of the source device; and determining a target replication policy based on the replication policy model and the current status information, the target replication policy indicating a replication policy to be applied for performing the pending data replication.

In a second aspect of the present disclosure, there is provided a device for managing data replication, comprising: at least one processing unit and at least one memory. The at least one memory is coupled to the at least one processing unit and stores instructions executable by the at least one processing unit. The instructions, when executed by the at least one processing unit, cause the device to perform acts comprises: obtaining a replication policy model associated with data replication of a source device, the replication policy model being determined based on historical status information of the source device and a historical replication policy corresponding to the historical status information; determining current status information of the source device, where the current status information indicates status information associated with pending data replication of the source device; and determining a target replication policy, based on the replication policy model and the current status information, the target replication policy indicating a replication policy to be applied for performing the pending data replication.

In a third aspect of the present disclosure, there is provided a computer program product. The computer program product is tangibly stored on a non-transient computer readable medium and includes a machine executable instruction, and the machine executable instructions which, when executed, causes a machine to implement any step of the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of the present disclosure will become more apparent, through the following detailed description of the exemplary embodiments of the present disclosure with reference to the accompanying drawings, in which the same reference symbols generally refer to the same elements.

DETAILED DESCRIPTION OF EMBODIMENTS

Preferred embodiments of the present disclosure will now be described in detail with reference to the accompanying drawings. Although the drawings illustrate preferred embodiments of the present disclosure, it would be appreciated that the present disclosure may be implemented in various manners but should not be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

Figure 1:
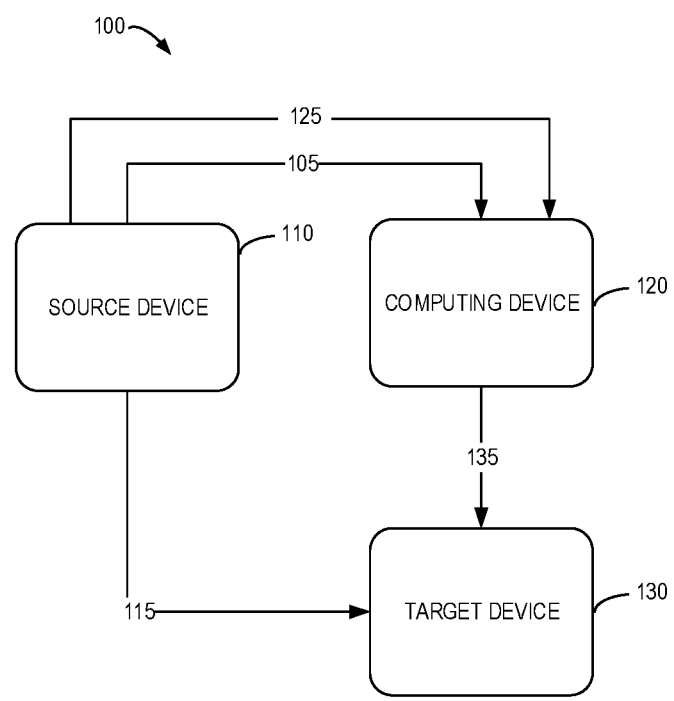
FIG. 1 illustrates a schematic diagram of an architecture that may implement embodiments of the present disclosure.

FIG. 1 illustrates a schematic diagram of architecture 100 that may implement embodiments of the present disclosure. It would be appreciated that the structure and functionality of the architecture 100 as shown in FIG. 1 are provided merely as an example, without implying any limitation to the scope of the present disclosure. Embodiments of the present disclosure may be implemented in different structures and/or architectures.

As shown in FIG. 1, the architecture 100 includes a source device 110 and a target device 130. The source device 110 may also be referred to as user end, and the target device 130 may also be referred to as server end for storing data from the source device 110. In some embodiments, the source device 110 and the target device 130 may communicate via a network. Data 115 to be replicated in the source device 110 is replicated periodically to the target device 130 in a unit of data block, to accomplish the purpose of data protection. The size of the data block, for example, is 10 GB, and it would be appreciated that it is provided only as an example, without limitation, and the size of the data block may be of other numerical value.

As described above, in the current backup/recovery solution, a user of the source device 110 predetermines a replication policy based on the need, the replication policy specifies occurrence time of replication and a length of time that replicated data is retained in the target device 130; and the policy is stored in the target device 130. It can be seen that, the replication policy is fixed. When a user's demand is changed, it takes the user a lot of time to configure a new replication policy. Moreover, when the status of the source device 110 is changed (for example, data are updated frequently), replication cannot be started automatically in advance according to the fixed replication policy, resulting in failure to protect data in time.

A solution of managing data replication is provided by embodiments of the present disclosure. The solution takes historical demands of a user and current status information of the source device 110 into account, and adjusts the replication policy automatically based on the information. In this way, it not only saves a lot of configuration time for a user, but also provides more intelligent, more efficient protection for user data. According to embodiments of the present disclosure, a computing device 120 is provided in the architecture 100, and the functionality/operation of the computing device 120 will be described below in detail with reference to FIG. 2. Preferably, the computing device 120 is implemented outside of the source device 110 and the target device 130.

Figure 2:
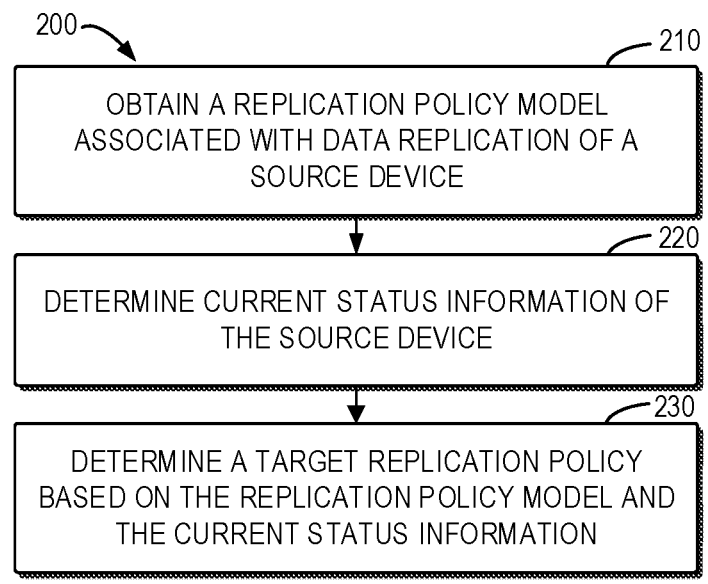
FIG. 2 illustrates a flowchart of a method of managing data replication according to embodiments of the present disclosure.

FIG. 2 illustrates a flowchart of a method 200 of managing data replication according to embodiments of the present disclosure. For example, the method 200 may be performed by the computing device 120 as shown in FIG. 1. Acts involved in the method 200 will be described below with reference to FIG. 1. It would be appreciated that the method 200 may also include additional acts not shown and/or may skip the acts shown, and the scope of the present disclosure is not limited in this aspect.

At block 210, the computing device 120 may obtain a replication policy model associated with a data replication of the source device 110, and the replication policy model may be determined based on historical status information of the source device 110 and a historical replication policy corresponding to the historical status information, which is substantially a model of a relation between the status information and the replication policy. Only as an example with no limitation, the replication policy model may be a machine learning model, for example, a decision tree model, an artificial neural network model etc.

According to some embodiments, the computing device 120 may obtain, from the source device 110, historical status information and a historical replication policy corresponding thereto, which are collectively referred to as historical data 105, as shown in FIG. 1. The historical status information indicates status information associated with the data replication of the source device 110 performed previously, while the historical replication policy indicates a replication policy adopted for data replication performed previously, given the historical status information. Alternatively, the computing device 120 preprocesses the historical data 105. The computing device 120 trains the replication policy model by taking the preprocessed historical status information and historical replication policy as sample status information and a sample replication policy, respectively. The trained replication policy model can reflect a user's historical needs precisely, i.e., a user formulate historical replication policies for different statuses of the source device 100. Alternatively, the trained replication policy model is stored and may be accessed by the computing device 120. This implement is more efficient.

At block 220, the computing device 120 may determine the current status information of the source device 110; the current status information indicates status information associated with pending data replication of the source device 110. Preferably, the current status information and the historical status information include the same information items (which are also referred to as attributes), e.g., a data size of the pending data replication, a resource utilization rate of the source device 110, time consumption for historical data replication etc.

According to some embodiments, the computing device 120 collects status information 125 of the source device 110 within a predetermined period of time before the pending data replication, as shown in FIG. 1. For example, after the last data replication starts, the computing device collects the status information 125 of the source device 110 a plurality of times in a certain frequency, for example, collecting once every day. Alternatively, the computing device 120 preprocesses the collected status information 125. The computing device 120 may determine the current status information based on the preprocessed status information. For example, the computing device 120 may compute a mean of values for the status information, e.g., geometric mean, harmonic mean, weight mean, quadratic mean and the like. As such, the status of the source device 110 within the period of time may be considered more thoroughly, so that the current status of the source device 110 can be determined more accurately.

According to some embodiments, the computing device 120 may determine the data size of the pending data replication of the source device 110, as the current status information. Only as an example with no limitation, the data size, for example, is a size of data to be replicated at the source device 110, a newly increased data size as compared to the previous replication, an average size of files and the like.

The data size, for example, may be represented in unit of bytes. By determining an average size of the files, the computing device 120 can determine a number of files to be replicated. The more the number of files, the more the time consumption for the replication.

According to another embodiment, the computing device 120 may determine the resource utilization rate of the source device 110 as the current status information, including, for example, computing resources, storage resources and network resources. The computing resource utilization rate may be related to the CPU utilization rate of the source device 110. The storage resource utilization rate may be related to a memory utilization rate of the source device 110 or I/O utilization. The network resource utilization rate may be related to the network bandwidth of the source device 110 and round-trip time (RTT). A high resource utilization rate of the source device 110 may indicate that data of the source device 100 is probably updated frequently, and may be required to perform data replication more frequently so as to protect data in time.

According to a further embodiment, the computing device 120 may determine time consumption for historical data replication before the pending data replication, as the current status information. For example, the computing device 120 may determine the time consumption for the last data replication, and thus estimate time consumption for the pending data replication.

At block 230, the computing device 120 determines a target replication policy 135 based on the replication policy model obtained at block 210 and the current status information obtained at block 220, and the target replication policy 135 indicates a replication policy adopted for the pending data replication. Only served as an example with no limitation, the computing device 120 takes the current status information as an input of the replication policy model, and takes an output obtained from the replication policy model as the target replication policy 135.

According to some embodiments, the computing device 120 may determine a start time for the pending data replication. For example, when determining that the resource utilization rate of the source device 110 is high, the computing device 120 may advance the start time automatically according to the replication policy model, so as to make the data replication in time. As another example, when determining that the pending data replication of the source device 110 will take a comparatively long time, the computing device 120 may also advance the start time automatically according to the replication policy model, to avoid too much time consumption for replication due to too large data, and to prevent user experience from being affected.

According to another embodiment, the computing device 120 may determine a length of time that the data 115 of the pending data replication retains in the target device 130. For example, if need of a user is directed to retaining the data updated frequently for a shorter time duration, and the need is reflected in historical data (for example, the user which is an instant messaging application company requires to retain the data updated frequently (for example, during holidays) for a short time), then the computing device 120, when determining that the resource utilization rate of the source device 110 is high, may automatically set the length of time for retaining the data 115 in the target device relatively short according to the replication policy model.

Figure 3:
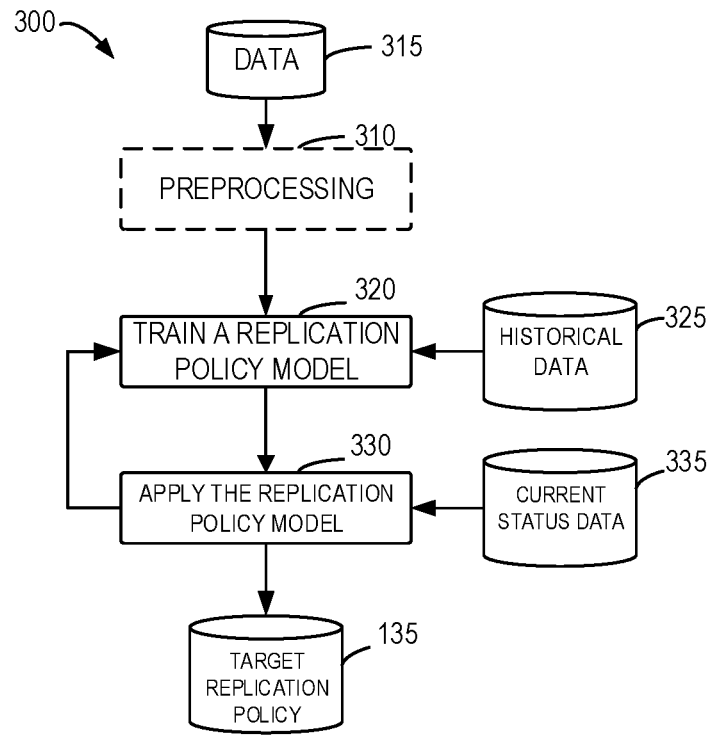
FIG. 3 illustrates a schematic diagram of a procedure for generating a target replication policy according to embodiments of the present disclosure.

According to some embodiments, the computing device 120 may update the replication policy model with the current status information and the target replication policy 135. FIG. 3 illustrates a schematic diagram of a procedure 300 for generating the target replication policy 135 according to embodiments of the present disclosure. As shown, the computing device 120 receives data 315 from the source device 110, where the data includes the historical data 105 and the status information 125 shown in FIG. 1. Alternatively, at block 310, the computing device 120 preprocesses the data 315. At block 320, the computing device 120 trains the replication policy model with the preprocessed historical data 325 as sample status information and a sample replication policy.

At block 330, the computing device 120 applies the trained replication policy model to the determined current status data 335, so as to obtain the target replication policy 135. In some embodiments, the computing device 120 adds the current status information 335 and the target replication policy 135 to the sample status information and the sample replication policy, and retrains the replication policy model, i.e., returns to block 320, with the updated sample status information and sample replication policy. By retraining using expanded samples, the replication policy model can become more robust, enabling the computing device 120 to formulate the target replication policy 135 more in line with the need of user, based on the current status information. In another embodiment, the replication policy model is not retrained entirely, but tuned finely with newly added sample data, so that updating of the model becomes more efficient.

According to some embodiments, a user may be provided with options of using the technical solution according to the present invention and the legacy solution. If the user selects the legacy solution, the status information of the user is not collected, nor is its replication policy updated automatically.

The replication policy model may be a Hoeffding tree based very fast decision tree (VFDT) model, which will be introduced below in more details. It would be appreciated that, the VFDT model is only an example, and the replication policy model may also be based on ID3, ID4, ID5R, C4.5 and SLIQ learning algorithms, and the like.

The Hoeffding tree algorithm may be applied to classification of data stream. The effect of the Hoeffding tree is that: split attributes of nodes in the tree may be determined with fewer data samples, and how many data samples are required is determined by a Hoeffding bound $\epsilon$:

$$\epsilon = \sqrt{\frac{R^2 \ln(1/\delta)}{2n}} \quad (1)$$

where, R is a range of a real number random variable r, and n is the number of independent variables of the observed variable r. Assumed that $\bar{r}$ is a mean value computed from n independent variables, the Hoeffding bound $\epsilon$ specifies that, with a probability 1-$\delta$, the true mean value of the variables is at least $\bar{r}$-$\epsilon$. The Hoeffding bound is able to give the same results regardless of the probability distribution of the generated observations. However, the number of observations required to reach certain values of $\delta$ and $\epsilon$ are different across probability distributions. Pseudo code of the Hoeffding tree is provided in Table 1.

TABLE 1

Pseudo code of Hoeffding Tree

Let HT be a tree with a single leaf (the root)
For all training samples do
   Sort samples into leaf $\iota$ using HT TABLE 1-continued Pseudo code of Hoeffding Tree

```
Update sufficient statistics in ι
Increment n_ι, the number of examples seen at ι
If n_l mod n_min=0 and examples seen at ι not all of same class then
    Compute G̅_ι(X_ι) for each attribute
    Let X_a be attribute with highest G̅_ι
    Let X_b be attribute with second-highest G̅_ι
```
Compute Hoeffding bound $\epsilon = \sqrt{\dfrac{R^2 \ln(1/\delta)}{2n_l}}$
```
    If X_a≠X_0, and (G̅_ι(X_a) − G̅_ι(X_b)) > ε or ε< τ) then
        Replace ι with an internal node that splits on X_a
        For all branches of the split do
            Add a new leaf with initialized sufficient statistics
        End for
    End if
End if
End for
```

The Hoeffding tree determines a minimum number of samples required by node split with the Hoeffding bound $\epsilon$. The Hoeffding tree is generated by constantly replacing leaf nodes with branch nodes, i.e., each decision node retains an important statistical quantity, and split is made when the statistical quantity of the node reaches the Hoeffding bound. The Hoeffding tree can reach an accuracy rate of a general decision tree, and along with arriving of data in the data stream, the Hoeffding tree can continue building the tree when performing classification. The very fast decision tree (VFD) is a Hoeffding tree based improved algorithm, which discards useless nodes and attributes thereof, thereby having better storage utilization rate.

Figure 4:
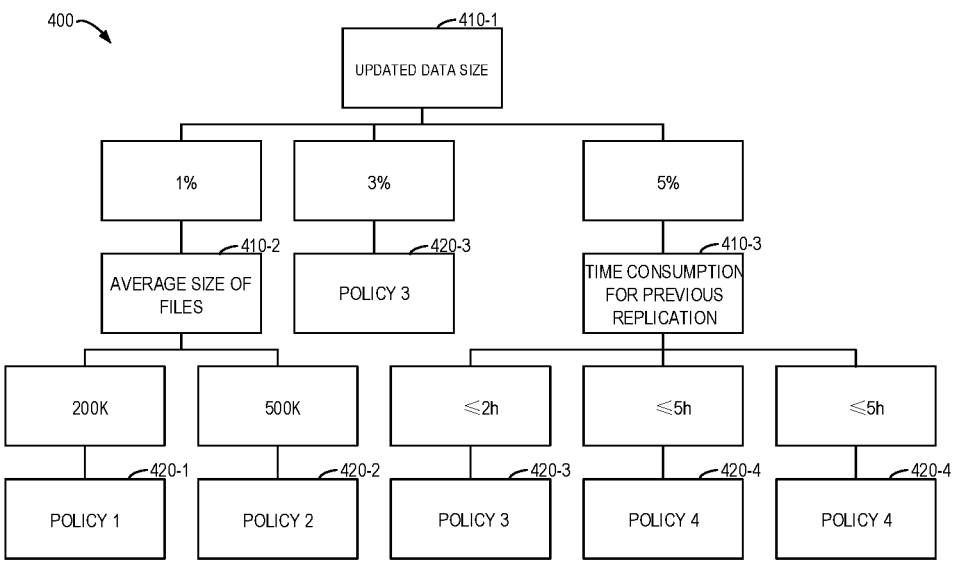
FIG. 4 illustrates a schematic diagram of a Hoeffding tree built based on historical data, according to embodiments of the present disclosure.

An example of the historical data 325 is provided in Table 2. FIG. 4 illustrates a schematic diagram of a Hoeffding tree 400 built based on the historical data 325. Various attributes in composite status information, e.g., an updated data size 410-1, an average file size 410-2 and time 410-1 consumption for the last replication, are synthesized to obtain respective leaf nodes of the tree, i.e., various replication policies 420-1, 420-2, 420-3 and 420-4. In some embodiments, daily average data of a user end is imported to the computing device 120 for incremental training, so as to enrich the current decision tree. For example, when the size of updated data of the user end is increased or I/O use is increased within a period of time, the computing device 120 may determine a new replication policy, thereby protecting the user data more safely and efficiently.

factors based on historical needs, to select an optimum replication policy for data backup of the user end. In this way, the user data can be protected more intelligently and more efficiently.

Figure 5:
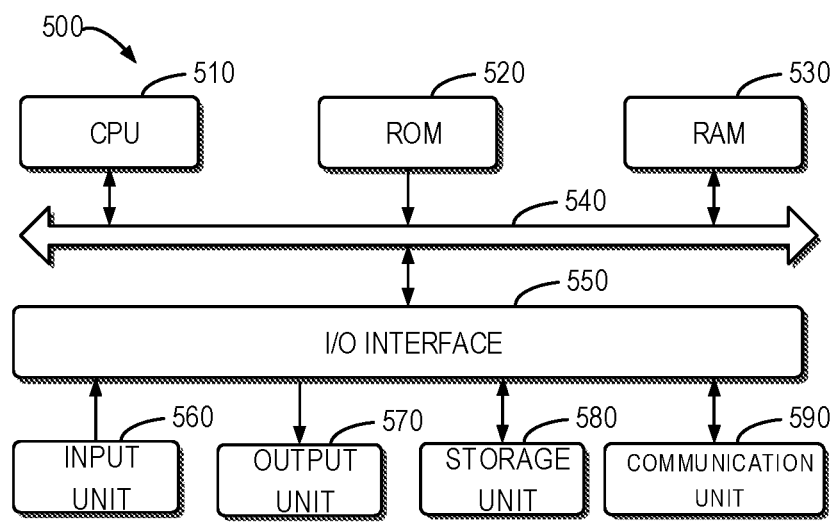
FIG. 5 illustrates a schematic block diagram of an example device that may be used to implement embodiments of the present disclosure.

FIG. 5 illustrates a schematic block diagram of an example device 500 that can be used to implement embodiments of the present disclosure. As shown, the device 500 includes a central processing unit (CPU) 510 which performs various appropriate acts and processing, according to a computer program instruction stored in a read-only memory (ROM) 520 or a computer program instruction loaded from a storage unit 580 to a random access memory (RAM) 530. The RAM 530 stores therein various programs and data required for operations of the device 500. The CPU 510, the ROM 520 and the RAM 530 are connected via a bus 540 with one another. An input/output (I/O) interface 550 is also connected to the bus 540.

A plurality of components in the device 500 are connected to the I/O interface 550: an input unit 560 e.g., a keyboard, a mouse, etc.; an output unit 570 e.g., various kinds of displays and a loudspeaker, etc.; a storage unit 580 e.g., a magnetic disk, an optical disk, etc.; and a communication unit 590 e.g., a network card, a modem, and a wireless communication transceiver, etc. The communication unit 590 allows the device 500 to exchange information/data with other devices through a computer network such as an Internet and/or various kinds of telecommunications networks.

Various processes and processing described above, e.g., the method 200 or procedure 300, may be executed by the processing unit 510. For example, in some embodiments, the method 200 or procedure 300 may be implemented as a computer software program that is tangibly included in a machine readable medium, e.g., the storage unit 580. In some embodiments, part or all of the computer programs may be loaded and/or mounted onto the device 500 via the ROM 520 and/or communication unit 590. When the computer program is loaded to the RAM 530 and executed by the CPU 510, one or more steps of the method 200 or procedure 300 as described above may be performed.

The present disclosure may be a method, an apparatus, a system, and/or a computer program product. The computer program product may include a computer readable storage medium having computer readable program instructions thereon for causing a processor to carry out aspects of the present disclosure.

TABLE 2

Exemplary historical data

| Data size | Updated data size | Average file size | CPU | Memory | Time consumption for the last replication | I/O | Network bandwidth | Network RTT | Replication policy |
|---|---|---|---|---|---|---|---|---|---|
| 1 G | 1% | 200K | 5% | 20% | ≤1 h | 1% | 1 Gb/s | 10 ms | Policy 1 |
| 10 G | 1% | 500K | 10% | 30% | ≤1 h | 2% | 1 Gb/s | 20 ms | Policy 2 |
| 10 G | 3% | 1M | 7% | 10% | ≤1 h | 5% | 1 Gb/s | 5 ms | Policy 3 |
| 100 G | 5% | 2M | 15% | 50% | ≤2 h | 7% | 10 Gb/s | 10 ms | Policy 3 |
| 100 G | 5% | 1M | 10% | 70% | ≤5 h | 10% | 10 Gb/s | 20 ms | Policy 4 |
| 100 G | 5% | 200K | 8% | 30% | ≤5 h | 1% | 10 Gb/s | 10 ms | Policy 4 |

As can be seen from the above description, embodiments of the present disclosure can implement a dynamic, intelligent and automatic adjustment to a replication policy. Several factors of a user end may determine importance of data to a user, and the present technical solution combines these The computer readable storage medium may be a tangible device that may store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, e.g., punch-cards or raised structures in a groove having instructions recorded thereon, and any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein may be downloaded to respective computing/processing devices from a computer readable storage medium or to an external computer or external storage device via a network, for example, an Internet, a local area network, a wide area network and/or a wireless network. The network may comprise copper transmission cables, optical fiber transmission, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine related instructions, microcode, firmware instructions, state-setting data, or either source code or object code written in any combination of one or more programming languages, including an object oriented programming language such as JAVA, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In ta scenario related to a remote computer, the remote computer may be connected to the user's computer through any type of network, including a local area network (LAN) or a wide area network (WAN), or the connection may be made to an external computer (for example, through the Internet with an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus, and computer program products according to embodiments of the disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor unit of a general purpose computer, special purpose computer, or other programmable data processing apparatus to produce a machine, such that the instructions, when executed via the processing unit of the computer or other programmable data processing device, generate apparatus implementing the functions/acts specified in one or more blocks in the flowchart and/or block diagrams. These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in one or more blocks of the flowchart and/or block diagram.

The computer readable program instructions may also be loaded onto a computer, other programmable data processing apparatus, or other devices to cause a series of operational steps to be performed on the computer, other programmable data processing apparatus or other device to produce a computer implemented process, such that the instructions which are executed on the computer, other programmable data processing apparatus, or other devices implement the functions/acts specified in one or more block of the flowchart and/or block diagram.

The flowchart and block diagrams illustrate the architecture, functionality, and operation of possible implementations of systems, methods and computer program products according to a plurality of embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in a reversed order, depending upon functionalities involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing replication policy for data replication of a source device onto a storage system, comprising:

coupling a computing device to the source device and the storage system;

operating the computing device to dynamically and automatically adjust the replication policy by executing process comprising:
obtaining historical status information of the source device associated with each prior data replication from the source device and a historical replication policy corresponding to the historical status information;
training a replication policy model using the historical status information and the historical replication policy to thereby generate a current replication policy;
determining current status information of the source device, the current status information indicating status information associated with pending data replication of the source device;
using the replication policy model to determine a target replication policy by adjusting a schedule for replicating and length of time for retaining replicated data, based on the current replication policy and the current status information; and,
applying the target replication policy to performing the pending data replication;
wherein determining current status information includes determining at least CPU utilization rate of the source device, I/O utilization rate of the source device, and network bandwidth of the source device, and wherein the process further include adjusting replication frequency according to the CPU utilization rate of the source device, I/O utilization rate of the source device, and network bandwidth of the source device; and performing at least one of:
determining that CPU utilization rate increased and advancing start time of the replication; or
determining that time to complete current replication is increased and advancing start time of the replication; or
determining that CPU utilization rate increased and shortening retention time of replicated data.

2. The method of claim 1, wherein determining the current status information of the source device comprises:
collecting status information of the source device within a predetermined period of time before the pending data replication; and
determining the current status information based on the collected status information.

3. The method of claim 1, wherein determining the current status information of the source device further comprises determining at least one of the following:
a data size of the pending data replication;
a utilization rate of computing resources of the source device;
a utilization rate of storage resources of the source device;
a utilization rate of network resources of the source device; or
time consumption for historical data replication prior to the pending data replication.

4. The method of claim 1, wherein determining the target replication policy comprises determining at least one of the following:
a start time of the pending data replication; or
a length of time for retaining data of the pending data replication in a target device.

5. The method of claim 1, further comprises:
updating the replication policy model with the current status information and the target replication policy.

6. A device of managing replication policy for data replication of a source device onto a storage system, comprising:
at least one processing unit; and
at least one memory coupled to the at least one processing unit and storing instructions executable by the at least one processing unit, the instructions, when executed by the at least one processing unit, causing the at least one processing unit to perform operations, the operations comprising:
obtaining a historical status information of the source device associated with each prior data replication from the source device and a historical replication policy corresponding to the historical status information;
training a replication policy model using the historical status information and the historical replication policy to thereby generate a current replication policy;
determining current status information of the source device, the current status information indicating status information associated with pending data replication of the source device;
using the replication policy model to determine a target replication policy by adjusting a schedule for replicating and length of time for retaining replicated data, based on the current replication policy and the current status information; and,
applying the target replication policy to performing the pending data replication;
wherein determining current status information includes determining at least CPU utilization rate of the source device, I/O utilization rate of the source device, and network bandwidth of the source device, and wherein the operations further include adjusting replication frequency according to the CPU utilization rate of the source device, I/O utilization rate of the source device, and network bandwidth of the source device; and performing at least one of:
determining that CPU utilization rate increased and advancing start time of the replication; or
determining that time to complete current replication is increased and advancing start time of the replication; or
determining that CPU utilization rate increased and shortening retention time of replicated data.

7. The device of claim 6, wherein determining the current status information of the source device comprises:
collecting status information of the source device within a predetermined period of time before the pending data replication; and
determining the current status information based on the collected status information.

8. The device of claim 6, wherein determining the current status information of the source device further comprises determining at least one of the following:
a data size of the pending data replication;
a utilization rate of computing resources of the source device;
a utilization rate of storage resources of the source device;
a utilization rate of network resources of the source device; or
time consumption for historical data replication prior to the pending data replication.

9. The device of claim 6, wherein determining the target replication policy comprises determining at least one of the following:
a start time of the pending data replication; or
a length of time for retaining data of the pending data replication in a target device.

10. The device of claim 6, wherein the operations further comprise:

updating the replication policy model with the current status information and the target replication policy.

11. A non-transitory machine-readable medium having instructions stored therein, which when executed by a processor, cause the processor to perform operations, the operations comprising:
    obtaining a historical status information of a source device associated with each prior data replication from the source device and a historical replication policy corresponding to the historical status information;
    training a replication policy model using the historical status information and the historical replication policy to thereby generate a current replication policy;
    determining current status information of the source device, the current status information indicating status information associated with pending data replication of the source device;
    using the replication policy model to determine a target replication policy by adjusting a schedule for replicating and length of time for retaining replicated data, based on the current replication policy and the current status information; and,
    applying the target replication policy to performing the pending data replication;
    wherein determining current status information includes determining at least CPU utilization rate of the source device, I/O utilization rate of the source device, and network bandwidth of the source device, and wherein the operations further include adjusting replication frequency according to the CPU utilization rate of the source device, I/O utilization rate of the source device, and network bandwidth of the source device; and performing at least one of:
    determining that CPU utilization rate increased and advancing start time of the replication; or
    determining that time to complete current replication is increased and advancing start time of the replication; or
    determining that CPU utilization rate increased and shortening retention time of replicated data.

12. The machine-readable medium of claim 11, wherein determining the current status information of the source device comprises:
    collecting status information of the source device within a predetermined period of time before the pending data replication; and
    determining the current status information based on the collected status information.

13. The machine-readable medium of claim 11, wherein determining the current status information of the source device further comprises determining at least one of the following:
    a data size of the pending data replication;
    a utilization rate of computing resources of the source device;
    a utilization rate of storage resources of the source device;
    a utilization rate of network resources of the source device; or
    time consumption for historical data replication prior to the pending data replication.

14. The machine-readable medium of claim 11, wherein determining the target replication policy comprises determining at least one of the following:
    a start time of the pending data replication; or
    a length of time for retaining data of the pending data replication in a target device.

15. The machine-readable medium of claim 11, wherein the operations further comprise:
    updating the replication policy model with the current status information and the target replication policy.

* * * * *